(12) United States Patent
Lauderdale et al.

(10) Patent No.: US 10,620,988 B2
(45) Date of Patent: Apr. 14, 2020

(54) DISTRIBUTED COMPUTING ARCHITECTURE

(75) Inventors: Christopher G. Lauderdale, Newark, DE (US); Rishi L. Khan, Wilmington, DE (US)

(73) Assignee: ET International, Inc., Newark, DE (US)

(*) Notice: Subject to any disclaimer, the term of this patent is extended or adjusted under 35 U.S.C. 154(b) by 294 days.

(21) Appl. No.: 13/328,570

(22) Filed: Dec. 16, 2011

(65) Prior Publication Data

US 2012/0158817 A1 Jun. 21, 2012

Related U.S. Application Data

(60) Provisional application No. 61/424,052, filed on Dec. 16, 2010.

(51) Int. Cl.
*G06F 9/46* (2006.01)
*G06F 8/41* (2018.01)

(52) U.S. Cl.
CPC .............. *G06F 9/46* (2013.01); *G06F 8/45* (2013.01); *G06F 8/458* (2013.01)

(58) Field of Classification Search
CPC .............. G06F 9/46; G06F 8/45; G06F 8/458
USPC ........................................................ 709/201
See application file for complete search history.

(56) References Cited

U.S. PATENT DOCUMENTS

| | | |
|---|---|---|
| 5,699,351 A | 12/1997 | Gregerson et al. |
| 6,061,709 A | 5/2000 | Bronte |
| 6,085,215 A * | 7/2000 | Ramakrishnan ...... G06F 9/4887 718/102 |
| 6,736,325 B1 * | 5/2004 | Peacham .............. G06Q 20/341 235/487 |
| 7,360,219 B2 | 4/2008 | Rhine |
| 7,640,547 B2 * | 12/2009 | Neiman et al. ............... 718/104 |
| 9,542,231 B2 | 1/2017 | Khan et al. |

(Continued)

FOREIGN PATENT DOCUMENTS

| | | |
|---|---|---|
| CN | 1159858 A | 9/1997 |
| CN | 1303497 A | 7/2001 |

(Continued)

OTHER PUBLICATIONS

Cedric Augonnet, et al. (StarPU: A Unified Platform for Task Scheduling on Heterogeneous Multicore Architectures, In Concurrency and Computation: Practice and Experience, Euro-Par 2009, inria-00384363, version 1—May 14, 2009.*

(Continued)

*Primary Examiner* — Aaron N Strange
(74) *Attorney, Agent, or Firm* — Panitch Schwarze Belisario & Nadel LLP

(57) ABSTRACT

A distributed computing system may incorporate an implementation based on a codelet-based execution model, where a codelet is a high-level dataflow element. In addition to supporting the use of codelets, the system may further provide support for "datalets," which are an extension of codelets providing better built-in support for static dataflow programming. Such a distributed computing system, implementing computing based on such codelets, may incorporate an implementation of an execution model, locality management schemes, scheduling schemes, a type system, and/or management of heterogeneous systems.

53 Claims, 10 Drawing Sheets

(56) References Cited

U.S. PATENT DOCUMENTS

| | | | |
|---|---|---|---|
| 2003/0037224 | A1 | 2/2003 | Oehler et al. |
| 2003/0191927 | A1 | 10/2003 | Joy et al. |
| 2005/0188177 | A1 | 8/2005 | Gao et al. |
| 2008/0028095 | A1 | 1/2008 | Lang et al. |
| 2008/0189522 | A1 | 8/2008 | Meil et al. |
| 2008/0274755 | A1 | 11/2008 | Cholkar et al. |
| 2009/0154459 | A1 | 6/2009 | Husak et al. |
| 2009/0164399 | A1 | 6/2009 | Bell, Jr. et al. |
| 2009/0259713 | A1 | 10/2009 | Blumrich et al. |
| 2009/0288086 | A1 | 11/2009 | Ringseth et al. |
| 2011/0191775 | A1* | 8/2011 | Omara ............... G06F 9/46 718/102 |
| 2011/0271263 | A1* | 11/2011 | Archer ............... G06F 8/45 717/149 |

FOREIGN PATENT DOCUMENTS

| | | |
|---|---|---|
| CN | 1551006 A | 12/2004 |
| CN | 101533417 A | 9/2009 |
| EP | 1457877 A2 | 9/2004 |
| WO | 9961985 A1 | 12/1999 |
| WO | 03102758 A1 | 12/2003 |

OTHER PUBLICATIONS

H. Wang et al., A Services Oriented Framework for Next Generation Data Analysis Centers, Parallel and Distributed Processing Symposium, 2005, Proceedings, 19th IEEE International.*

Cedric Augonnet at al., "A unified runtime system for heterogeneous multicore architectures," 2008, 2nd Workshop on Highly Parallel Processing on a Chip (HPPC 2008) (Year: 2008).*

International Preliminary Report on Patentability and Written Opinion s in PCT/US2011/065532, dated Jun. 18, 2013.

Chinese Office Action for Chinese Application No. 201180060742. 8, dated May 21, 2015.

Office Action dated Jun. 27, 2016 in CN Application No. 201180060742.8.

Office Action dated May 4, 2017 in CN Application No. 201180060742.

Zuckerman et al., "Using a 'Codelet' Program Execution Model for Exascale Machines: Position Paper", Proc. 1st International Workshop on Adaptive Self-Tuning Computing Systems for the Exaflop Era, pp. 64-69 (Jun. 2011).

Dennis, "First Version of a Data Flow Procedure Language", Programming Symposium, Lecture Notes in Computer Science, vol. 19, pp. 362-376 (May 1975).

Dennis et al., "An Efficient Pipelined Dataflow Processor Architecture", Proc. ACM/IEEE Conf., pp. 368-373 (1988).

Augonnet et al, "Automatic Calibration of Performance Models on Hetergeneous Multicore Architectures," Parallel Processing Workshops, The Netherlands, pp. 56-65 (Aug. 25, 2009).

Hormati et al, "Flextream: Adaptive Compilation of Streaming Applications for Heterogeneous Architectures," 18th International Conference on Parallel Architectures and Compilation Techniques, Piscataway, NJ, pp. 214-223 (Sep. 12, 2009).

Maheswaran et al, "A dynamic matching and scheduling algorithm for heterogeneous computing systems," Seventh Proceedings of the Heterogeneous Computer Workshop, Orlando, FL, pp. 57-69 (Mar. 30, 1998).

Pllana et al, "Towards an Intelligent Environment for Programming Multi-core Computing Systems," Euro-par 2008 workshops—parallel processing, Berlin, DE, pp. 141-151 (Aug. 25, 2008).

Dolbeau et al, "HMPP: A Hybrid Multi-core Parallel PRogramming Environment," Proceedings of the Workshop on GEneral Purpose Processing on Graphics Processing Unit, Boston, MA, pp. 1-5 (Oct. 4, 2007).

Veen, "Dataflow Machine Architecture", ACM Computing Surveys, vol. 18, No. 4, pp. 365-396 (Dec. 1986).

Culler, "Dataflow Architectures", Laboratory for Computer Science, pp. 1-34 (Feb. 12, 1986).

International Search Report and Written Opinion for PCT/US2011/065532, dated Apr. 25, 2012.

* cited by examiner

DISTRIBUTED COMPUTING ARCHITECTURE

CROSS-REFERENCE TO RELATED APPLICATION

This application is a non-provisional application claiming priority to U.S. Provisional Patent Application No. 61/424,052, filed on Dec. 16, 2010 which is incorporated by reference herein in its entirety.

FIELD

Various embodiments of the invention may be related to various aspects of a computing environment for implementing distributed computing.

BACKGROUND

Modern high-end computer (HEC) architectures may embody thousands to millions of processing elements, large amounts of distributed memory with varying degrees of non-local memory, networking and storage infrastructure. These systems present a great opportunity for both static and dynamic optimization of resources utilized by executing applications. Traditionally, computer architectures have labored to present applications with a single, uniform address space, along with reasonable semantics for sequential execution of code and access to data. The resulting paradigm has served well for years, but becomes an impediment to optimal resource allocation when both computation and data are distributed, and when virtually all hardware speedup is accomplished via parallel processing rather than increased clock rates.

A great challenge in efficient distributed computing is to be able to provide system software that makes optimal use of the underlying hardware while providing a usable abstract model of computation for writers of application code. This may generally require that consistent choices be made along the spectrum of system elements, so that control, monitoring, reliability, and security are coherent at every level. Computer specification systems, coordination systems, and languages with clear and reasonable semantics will also be necessary so that a reasonably large subset of application developers can work productively in the new environment. In addition compilers or interpreters that support efficient distributed execution of application code will be required, and may necessitate related development tools to provide developers with options and insight regarding the execution of application code.

Applications that drive HEC development in general may include graph analysis applications such as graph searching, minimum path searching, and maximum flow analysis; generalized optimization applications, including nonlinear and mixed-integer programming and stochastic optimization; and scientific computing applications including image analysis, data mining, and finite element simulation. Larger consumer-oriented problems are also a target of HEC, and may include information search and indexing, text analysis, and information extraction.

BRIEF SUMMARY OF EMBODIMENTS OF THE INVENTION

Various embodiments of the invention may relate to hardware, software, and/or firmware, as well as methods, for implementing distributed computing systems. Such embodiments may incorporate an implementation of an execution model, locality management schemes, scheduling schemes, a type system; and/or management of heterogeneous systems.

BRIEF DESCRIPTION OF THE DRAWINGS

Various embodiments of the invention will now be described in further detail in conjunction with the accompanying drawings, in which.

DETAILED DESCRIPTION OF VARIOUS EMBODIMENTS OF THE INVENTION

Figure 1:
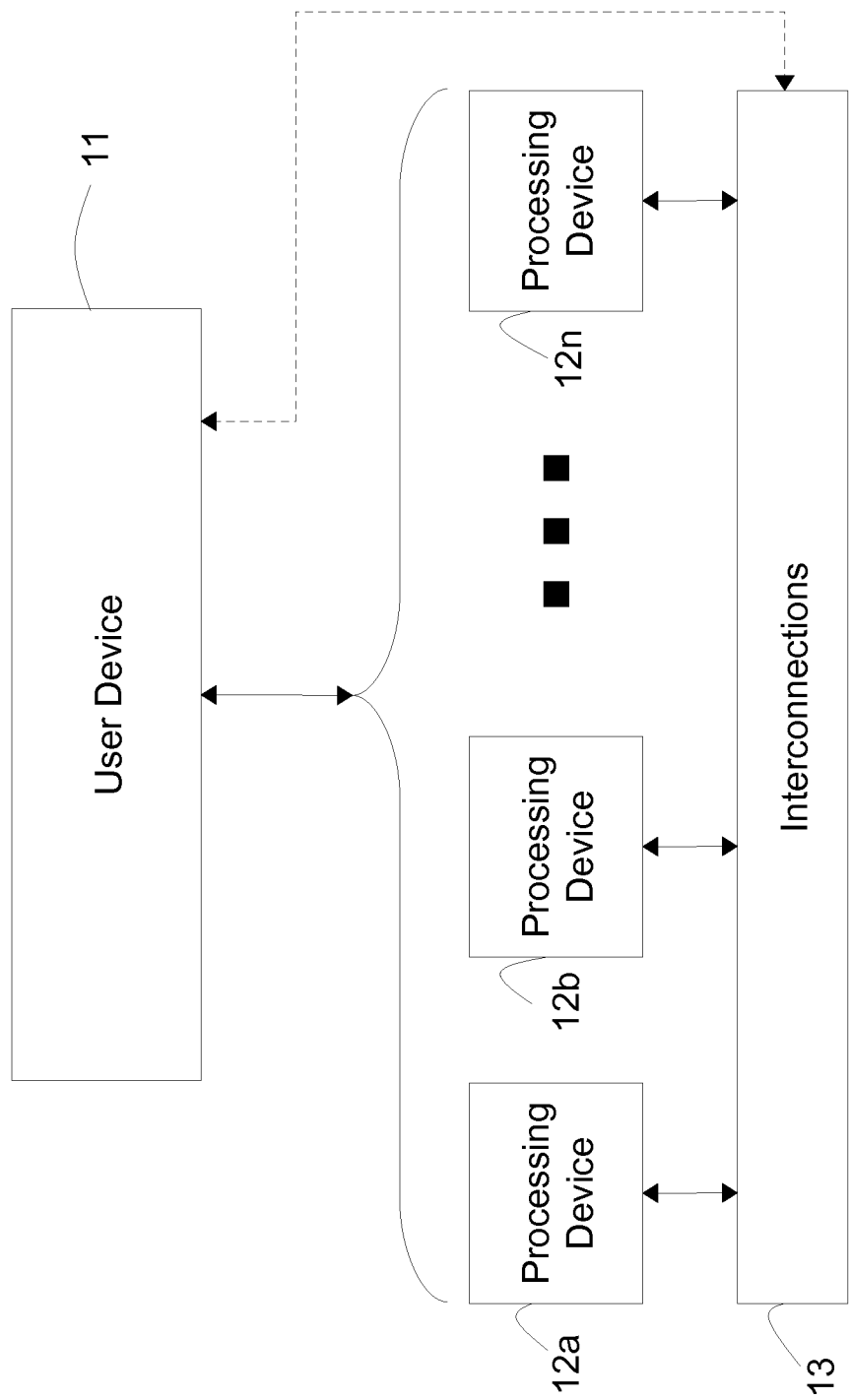
FIG. 1 shows a conceptual block diagram of a distributed computing system, according to various embodiments of the invention.

In a distributed computing system, a single program may be executed on multiple processing devices. FIG. 1 shows an example of how such a system may be implemented. A user device 11 may be used to prepare a program to be executed (including permitting a user to write the program). The user device may communicate with various processing devices 12a. 12b, . . . , 12n, which may be used to execute aspects of the program. The processing devices may be interconnected 13 among one another and/or with the user device 11. The user device and/or various ones of the processing devices may comprise computing systems such as the example shown in FIG. 2. Note that the user device 11 may also incorporate a processing device that may serve as part of the distributed computing system. Also note that one or more processing devices 12a, 12b, . . . , 12n may be contained in a single processor package, such as a a multi-core central processing unit (CPU).

Figure 2:
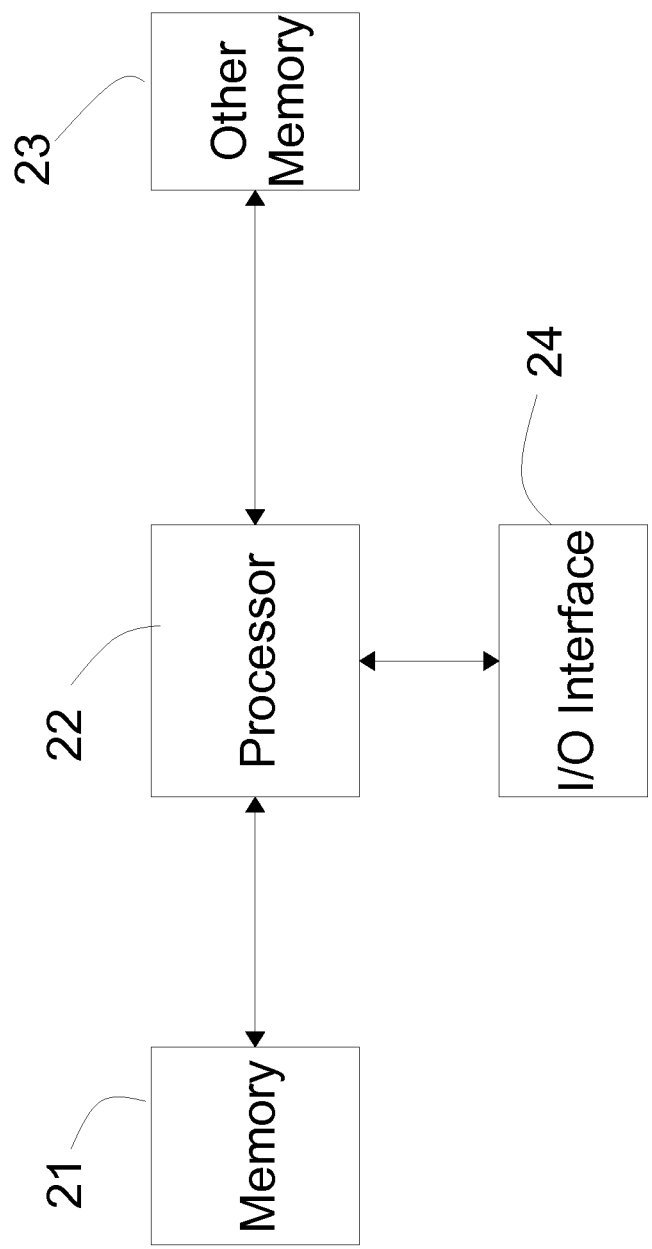
FIG. 2 shows a conceptual block diagram of a system that may be incorporated into or may utilize various embodiments of the invention.

FIG. 2 shows an exemplary system that may be used to implement various forms and/or portions of embodiments of the invention. Such a computing system may include one or more processors 22, which may be coupled to one or more system memories 21. Such system memory 21 may include, for example, RAM, ROM, or other such machine-readable media, and system memory 21 may be used to incorporate, for example, a basic I/O system (BIOS), an operating system, instructions for execution by processor 22, etc. The system may also include further memory 23, such as additional RAM, ROM, hard disk drives, or other processorreadable media. Processor 22 may also be coupled to at least one input/output (I/O) interface 24. I/O interface 24 may include one or more user interfaces, as well as readers for various types of storage media and/or connections to one or more communication networks (e.g., communication interfaces and/or modems), from which, for example, software code may be obtained. Such a computing system may, for example, be used as a platform on which to run translation software and/or to control, house, or interface with an emulation system. Furthermore, other devices/media, such as FPGAs, may also be attached to and interact with the system.

As discussed above, there are numerous issues that may need to be considered when implementing a distributed computing system. For example, one may need to consider how to distribute tasks, how to arrange for interactions/exchange of data among processing devices (e.g., 12a, 12b, ..., 12n and/or user device 11 of FIG. 1), how to facilitate efficient execution, how to facilitate preparation of programs for such a system, etc.

In order to accommodate various aspects of a distributed computing environment, a runtime architecture for such an environment may provide fine-grained scheduling services for program components, and to do so, the program may be decomposed differently from programs cast in traditional execution systems and associated programming languages, such as C. A distinction may thus be made between the "native" C/Pthreads execution model, which typically consists of largely independent threads calling reentrant functions using one call stack per thread (a model shared by most other imperative languages), and the execution model that may be used in various embodiments of the present invention.

Embodiments of the invention may use an execution model based on "codelets," which may individually constitute the fundamental unit of execution with respect to the runtime's scheduling algorithms. A codelet may include the following:

A description of a task to be performed under normal circumstances, in order to advance the state of the program. This is the codelet's "run fork."

An optional description of a task to be performed under exceptional circumstances, in order to back out a program state safely. This is the codelet's "cancel fork."

A description of the type of context frame expected by the codelet, if any. The context frame input to a codelet is analogous to the implicit this/self parameter passed to methods in object-oriented languages. "Context" refers to information that may be used by a codelet (or, in general, any procedure) to record its situation or state (e.g., variables, cached values, etc.).

A description of the type of input data expected by the codelet, if any.

Codelets may be represented within the runtime environment as descriptor objects containing references to a function for each fork, run and cancel, as well as descriptions of context and input types.

When it begins executing, a codelet may receive a reference to its context and input, as well as a reference to an environment buffer that may serve to allow it to manage its relationship to system hardware. In addition, a codelet may receive references to an additional "chain codelet" (see below) and associated "chain context" that should be run when the activity started by the codelet completes.

To run a codelet, a "codelet instance" may be readied by registering a reference to the codelet, a context, and an input with a scheduler (schedulers will be discussed further below). Codelet references may also be used to create partial codelet instances in varying stages of readiness; for example, a codelet waiting on input from the network may be registered with its context on a network interface, and its input can be filled in later to complete the codelet instance when data arrives from the network.

Once a scheduler selects a codelet for execution, that codelet may become "active" and may generally run to completion without preemption or blocking. This means that a codelet may utilize its processing thread exclusively for the duration of its execution. If a codelet encounters a condition that would traditionally result in blocking (e.g., reading from a file), it may spill any non-volatile data to its context, register a chain context and codelet with an appropriate software interface, and end its execution, ceding control to the runtime system. Once the registered-for event occurs, the registered chain codelet may then unpack state from the context and resume execution where the earlier codelet left off. This mechanism may allow hardware resources in use by a codelet to be relinquished and reused for other work while long-latency operations complete, without requiring heavyweight task- or thread-switching mechanisms that may involve the operating system. This mechanism can also be used to spawn more codelets—for example, by registering several codelet instances with schedulers.

In some cases, it may be necessary to use more than one codelet to complete a task. For example, reading a line of text from a file may involve any number of blocking operations, each requiring a codelet to spill to its context, register to resume, end, and eventually resume. A group of codelets that work towards a single goal may be referred to as a "codelet complex." Typically all codelets in a complex may use the same context object, whether individually in sequence or together in parallel. Codelets may also form "subcomplexes" that perform a smaller portion of the task on behalf of an overarching "supercomplex." For example, a codelet complex may be used for reading a line of text from a file, a supercomplex may use that complex while parsing an entire file and storing its data in memory, a super-supercomplex may use the parsing complex to ready its configuration data before launching into the application core, and so forth. Complexes may thus be thought of as being analogous to subroutines in high-level programming languages, in terms of effects on program structure; however, they are not necessarily subject to the same last-in, first-out (LIFO) ordering requirements as subroutines in most languages.

As mentioned above, when a codelet begins executing, it may be given a reference to a chain codelet and context, which together may be referred to as a "chain pair." This may provide a simple mechanism for indicating dependency upon completion of some task, and may be viewed as related to the return address typically passed implicitly into any traditional subroutine call. To revisit the above line-reading example, passing a chain pair to a codelet that starts a line-reading complex may result in the chain codelet being readied after the entire line is read, with the newly read text as its input.

Within an active codelet, the execution model may be similar to traditional stack-based models, and assuming the underlying platform supports it, the codelet may make function calls normally. The codelet may also temporarily suspend its own execution by explicitly "yielding" to the runtime software, which may allow one or more other codelets to run on the same program stack as if called directly from within the suspended codelet, after which the scheduler may resume execution of the suspended codelet as if nothing had happened.

Embodiments of a runtime environment according to the invention may support traditional function calls and/or stack-based exception handling for use within a codelet, and may additionally support bi-directional exception resume semantics that may allow fast and simple error recovery when possible. However, transmitting exceptions between codelets may not be possible through the stack-based mechanism because the codelets may not be directly related to each other on a program stack, and will likely have no clean LIFO ordering. To this end, each codelet may have an optional cancel fork that can be used during chaining.

A chain codelet may be dealt with by running it normally (via the run fork) or by canceling it (via the cancel fork). The cancel fork may be used to transmit an exception into a chain codelet, much as a stack-based exception throw may transmit an exception into a caller function. A chain pair may be passed into a codelet's cancel fork to provide support for resumption after error recovery, much as a chain pair can be passed into the run fork to support completion. Codelets, according to various embodiments of the invention, may be closely related to the currently prevalent function- and-stack-based execution model, and may act as an extension to it. The major differences between a function and a codelet are that no ordering constraints (LIFO or otherwise) are imposed on codelets with respect to each other, except those constraints that are enforced by the behavior of the codelets themselves;

instead of a return address and the caller's stack/exception frame pointers, a codelet accepts a chain pair; and the chain pair may be triggered at any time after the codelet becomes active (including during the codelet's execution or suspension), whereas a function's return may not overlap with the function's own execution.

Because the requirements imposed on codelets are weaker than those imposed on functions, codelets may be used to implement traditional-style LIFO-ordered functions.

Of course, the traditional stack-based mechanism may still be useful, primarily because of its extremely low overhead; data allocation on the stack may require only addition and subtraction operations, and a function call may typically involve only a register store or stack push operation. It follows from this that, for a codelet-generating compiler, converting a chained codelet call to an intra-codelet LIFO function call may be very similar to a non-codelet-generating compiler in-lining function calls. If a compiler generates both codelet- and function-based forms of its output where possible, it may also be possible to statically or dynamically choose between a lower-overhead synchronous (LIFO) function-based call and a higher-overhead asynchronous codelet-based call.

Figure 10B:
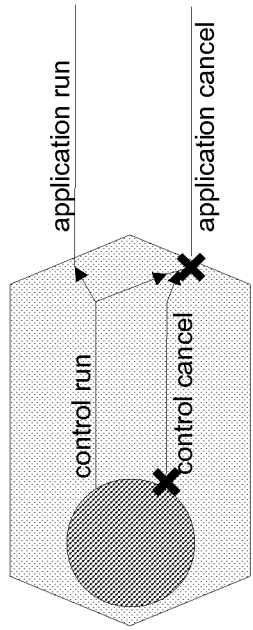
FIG. 10, consisting of FIGS. 10a-10d, shows the behavior of datalets as it relates to codelets' behavior, in various embodiments of the invention.
Figure 10A:
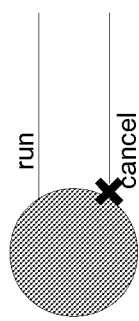

Embodiments of this invention may, in addition to providing support for codelets, provide support for "datalets," which are an extension to codelets providing better built-in support for static dataflow programming. Codelets may accept a single context, input, and chain pair, and may be executed as soon as these data are ready. Datalets may accept a single context and chain pair, but may also accept any number of inputs, which may be prepared and assigned asynchronously and in any order. Datalets, like codelets, may have an associated descriptor in memory that may allow runtime components to refer to the datalet directly, and this descriptor may include all components of a codelet descriptor (including references to run/cancel forks), as well as descriptions of all inputs and their types and references to application-provided run and cancel fork functions. Because datalet behavior may extend codelet behavior, the codelet aspect of the datalet may use separate internal run and cancel fork functions to accept and prepare inputs for the datalet, and to launch the datalet-specific run/cancel fork functions. A datalet's internal run/cancel forks are referred to hereinafter as its "control forks" (e.g., its control run fork or control cancel fork), and the application-specified forks as "application forks." FIGS. 10a and 10b illustrate the differences between codelets' forks (FIG. 10a) and datalets' forks (FIG. 10b).

Figure 10C:
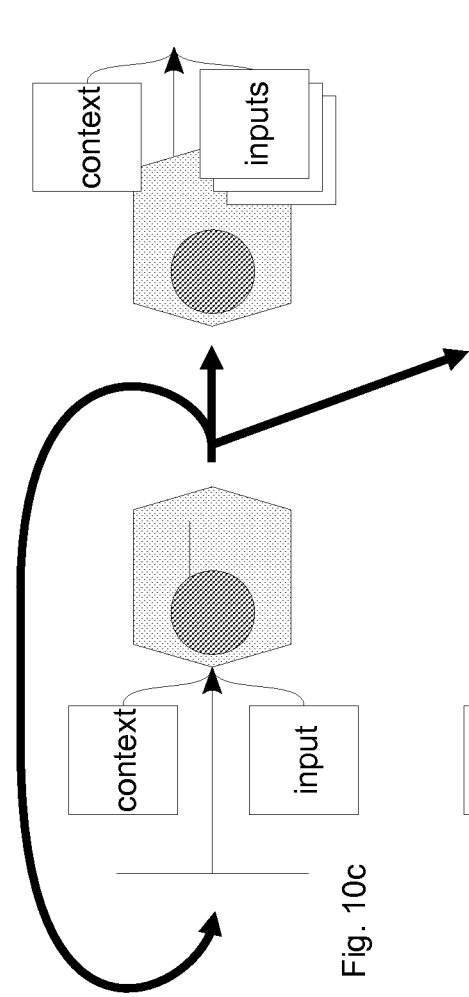
Figure 10D:
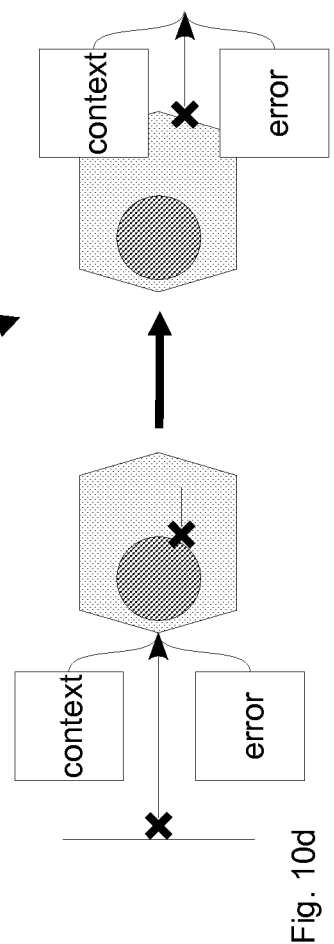

When assigning inputs to a datalet, an identifier (e.g., an integer) for the input, a value for the input, and a chain pair to be executed when the input is no longer needed may be passed in together as input to the control run fork of a datalet. The control run fork, upon starting, may take any action necessary to prepare the input for later use by the datalet's application run fork and/or schedule the application run or cancel fork for execution (FIG. 10c). Cancelling a datalet may result in collected inputs for a particular context being discarded, and the datalet's application cancel fork may be called as a result (FIG. 10d). Regardless of the method used to start the application forks, once an input has been "consumed" by a datalet—that is, once an application fork has caused its chain pair to be executed—any chain pairs passed in with inputs may be dispatched. An embodiment of the invention may effect this process by passing in a runtime-internal chain pair from control forks to application forks, and then using the chain codelet to clean up datalet inputs.

Several varieties of datalet behavior may be especially useful, and correspond to the logical AND, OR, and XOR operators. An AND-based datalet may run its application run fork after all specified inputs have been received and prepared for use, using the context parameter to the control run fork to map to queues of specific input values, and once all input values have been collected for a particular context, the values may be dequeued and the datalet's application run fork may be started. An OR-based datalet may run its application run fork if any or all of the inputs have been collected; different embodiments may opt to run the application run fork as soon as any one input is collected (effectively identical behavior to an XOR-based datalet), may wait until some minimum number of inputs have been collected, or may wait for some brief delay to allow inputs to accumulate, among other behaviors. An XOR-based datalet may run its application run fork as soon as a single input has been received, and may only pass that single input into the application run fork. Embodiments of the invention may implement or provide for other datalet behaviors (e.g., timed NOT- or NOR-based datalets). In addition, some embodiments may provide for input lists and types specified dynamically.

Figure 4:
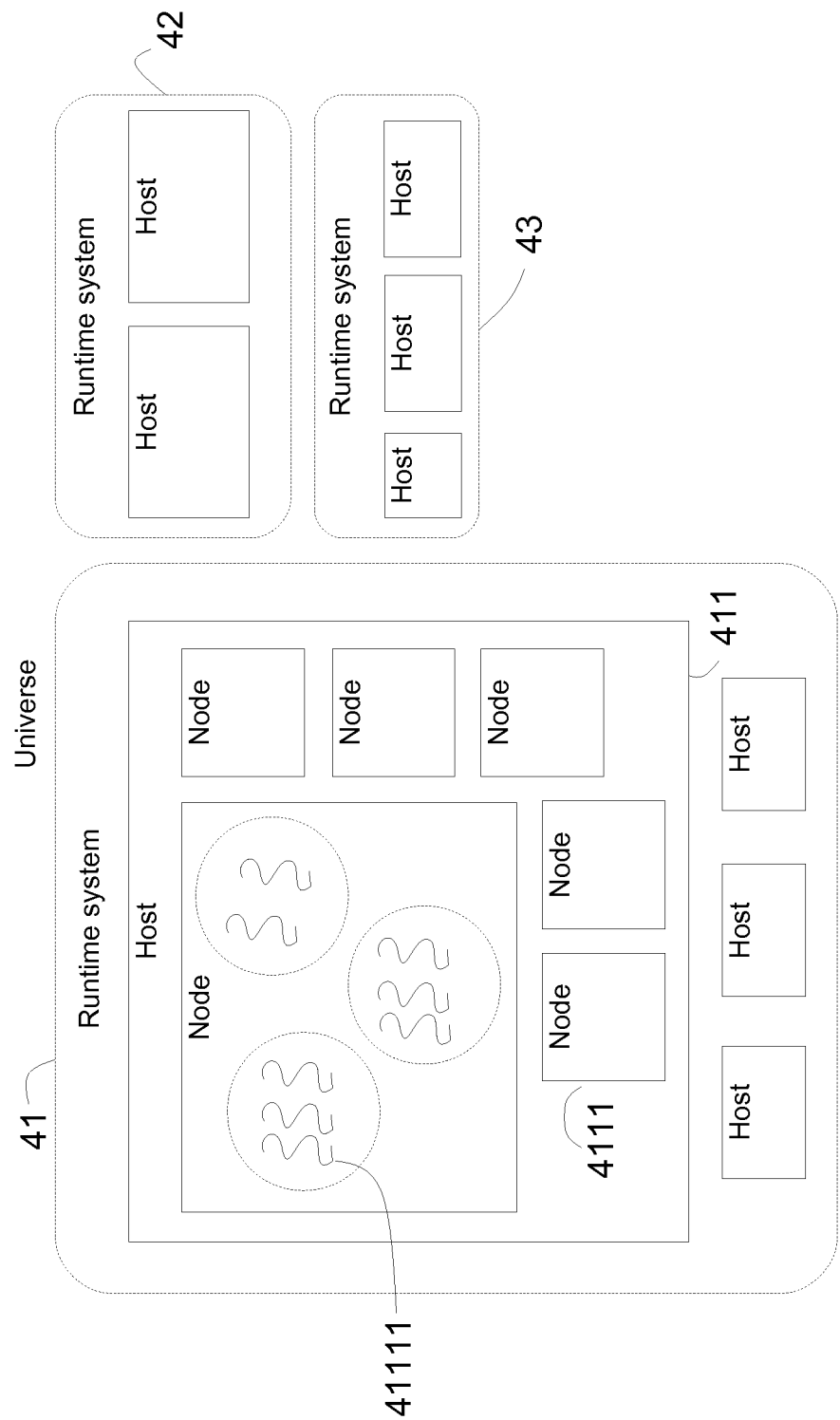
FIG. 4 shows a conceptual hierarchical representation of embodiments of the invention.

A system according to various embodiments of the invention may be divided up along roughly hierarchical lines as shown in FIG. 4. A computing "universe" may include one or more runtime systems, such as systems 41, 42, and 43. A given runtime system may include one or more hosts, such as host 411. A host may include one or more processing nodes, such as node 4111. A processing node 4111 may be used to run one or more software or hardware threads 41111.

Codelet execution may occur on a hardware or software thread that may be managed by the runtime system. These threads may be grouped together based on the degree of information that can readily be shared between them; for example, two threads that share a cache might be grouped together, or all cores on a host might be grouped together. These groupings may be nested into a tree-like structure, or "locale tree," that may be used to describe communication characteristics for software executing on a distributed platform.

Each locale in the tree may have associated storage and processing resources, which may, respectively, manage allocation of memory space and processing time within the locale. Leaf (i.e., bottom-level and childless) locales' allocators and schedulers may manage space/time allocation within their described hardware or software structures, whereas higher-level locales' allocators and schedulers may manage their own allocation and/or their descendants', potentially allowing aggregation of descendants' hardware and software resources.

Because locales may represent bounded areas of a computing system, the software interface to locales provided by embodiments of the invention may provide for the transfer of data and control between those areas, across boundaries that normally require special software support or explicit handling. Locales may enable abstraction of disparate data transfer methods, including intra-address-space data transfer (e.g., pointer sharing and bulk copying), intra-node inter-address-space transfer (e.g., sharing memory mappings or using local socket interfaces), and/or inter-node transfer (e.g., explicit packet-/message-based communication across network/bus interconnects).

In addition to data transfer, a codelet executing within one locale may widen, narrow, or entirely transplant its execution scope within the locale tree. This may allow a program component's execution to be explicitly or implicitly forwarded to data upon which it needs to act, and may allow the system to dynamically react to data availability and placement.

The techniques for managing locales may further assist in managing issues relating to heterogeneity within systems. Because it is expected that future computing systems will exhibit a great deal of hardware heterogeneity, it may be desirable to design a distributed runtime system to deal with it well. By unifying the abstraction used for communication, scheduling, and memory allocation, embodiments of the present invention may enable straightforward distribution of execution.

The above-described locale tree may be extended to describe disparate hardware components, if available. For example, a GPU with attached memory may be given its own locale, with its own scheduler and allocator that refer specifically to it. Because codelets may be represented as high-level polymorphic objects to the runtime, multiple forms of the run or cancel fork may be stored with the codelet object, e.g., one for a CPU architecture and one for a GPU architecture, and the runtime may then automatically select from the forms as needed. Because both automatic and explicit scheduling may be allowed, programs may either explicitly locate and schedule codelets to a GPU, for example, or they may let the runtime schedule to the GPU as it and appropriate work become available. Embodiments of the inventive runtime system may also allow integration of architectures that are typically incompatible; for example, data may be migrated easily between little-endian and big-endian architectures, or between architectures with different pointer formats, using the Transferable interface type (discussed in more detail below), discussed below, to port data between the architectures' respective locales. (On the other hand, not using Transferable may allow an object to be implicitly pinned to its address space, although a system with compacting garbage collection may still relocate the object within the address space.)

Using locales as a basis for data transfer may also make it possible for the boundaries between networked compute nodes to be ignored by the application in many cases. As long as a program component has enough local data and available memory space to run, it may seldom matter where that component's execution takes place, or on what precise piece of hardware. By allowing the runtime to manage communications and execution placement, an application component may be transparently migrated as needed, for example, to reduce communications overhead or to balance local processing or memory load.

The locale hierarchy may be used by codelet schedulers and/or other software resources to derive a rough measure of locality, and thus to assist in determining placement of codelet execution and/or context. In one embodiment, the default behavior may be to require cooperating codelets to share a single context block in memory—and these codelets may ideally be executing somewhere near this context block. In another embodiment, it may be desirable for more highly parallel codelet complexes to distribute their execution across a larger collection of system resources.

Figure 5:
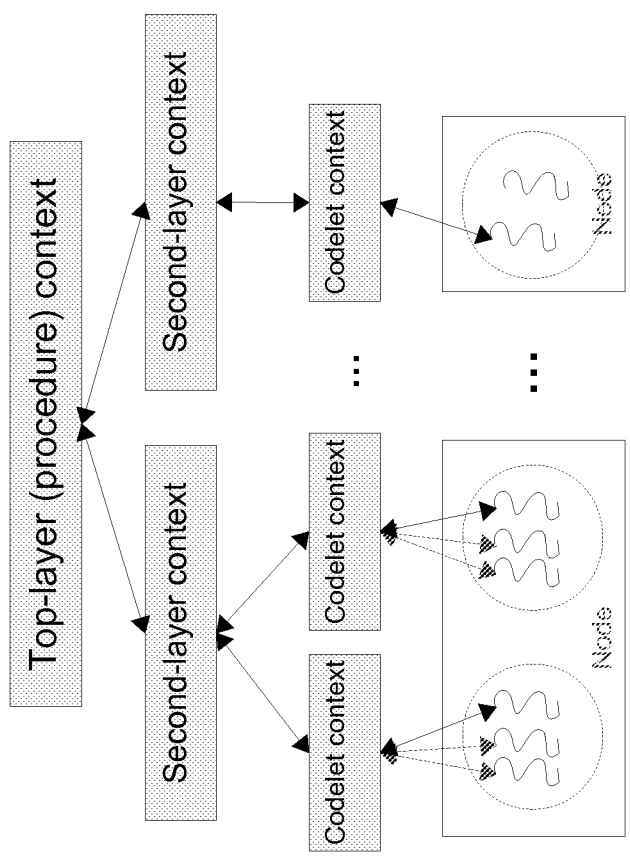
FIG. 5 shows a context hierarchy according to various embodiments of the invention.

To this end, complexes may utilize several layers of context, which may be arranged in a tree-like structure overlaid on top of the locale tree; FIG. 5 shows an example of context layers. The leaves of the context layer tree may represent the most localized context blocks, which may correspond to the contexts that codelets see most readily and directly. Less localized context blocks can be referenced through parent pointers from the leaf contexts (although programming languages that generate code compatible with embodiments of the runtime system may obscure references through these pointers to higher-level layers). Consequently, a multi-layer context (in the example of FIG. 5, to which the invention is not limited, a three-layer context) can be used to provide a context layer shared among codelets running on different hardware threads within a single CPU core, another layer shared between codelets running on a single NUMA node or host, and a further layer shared amongst all codelets in a complex. Although normal single-layer procedure contexts may be shared directly between codelets, in some situations or embodiments it may be necessary to explicitly flush higher-layer contexts using explicit resource management calls in order to synchronize data stored there. In the typical embodiment, the higher-layer context may be flushed automatically when lower-layer contexts become unused and their storage is reclaimed. In an alternative embodiment, updates of context information may be postponed until current information is needed.

Each codelet executing in a runtime that embodies this invention may be provided with an "environment buffer" when it is started. An environment buffer may contain references to a locale in which the codelet is currently executing, to origin and sender locales that may specify the most recent hop and the originator for a codelet complex's execution route, and to receiver and destination locales that may specify next and final hops for the route. The environment buffer may be modified by a codelet using it, in order to redirect its execution path (e.g., by reversing it to effect a reply). A codelet's current environment buffer, in addition to being passed into a codelet when it begins execution, may be stored in a thread-local memory area or referenced by a thread-local pointer. The current environment buffer—in particular, the current and receiver locales—may be used by a runtime to select the locale in which allocation and scheduling requests should be completed. Thus if a codelet sets its environment buffer's receiver pointer to reference another thread's locale, any memory allocated may, by default, be allocated from that thread locale's allocator, and any other codelets scheduled may, by default, be scheduled to that thread. However, codelets may also circumvent their environment buffers and explicitly specify target locales for such operations.

In this discussion, there will be and have been references to "resources." For the purposes of this application, a resource is something upon which there may be a control or data dependency, involving a process or interface; i.e., if a resource involves hardware, the resource, for the purposes of this application, is a software interface to the hardware rather than the hardware itself (e.g., a software interface to a hardware processing device), unless otherwise specified (e.g., described explicitly as a "hardware resource", "device", etc.). Resources may include, but are not necessarily limited to, processing resources, such as interfaces to CPU threads/cores; storage resources, such as interfaces to on- or off-chip RAM and files on disk; communication resources, such as network sockets; shared data structures; and executable code, among other things. Resource interaction may occur through use of get and put operations. The put operation may be used to push data into a resource and may cause execution of some user-specified chain codelet on behalf its invoking process once finished, while get may be used to extract data from a resource and may cause execution of a user-specified chain codelet when finished. Chain codelets given to get and put operations are termed "completion codelets," or with an associated chain context, "completion pairs," since they execute only after completion of the operation in question.

To facilitate tree-like "conversations" between/among interacting resources, an embodiment of the invention may use "keys" to mark data/control exchanges with resources. A key acts as a descriptor for the state of a series of interactions with a resource, or as a selector for such a descriptor (i.e., a direct or indirect pointer to the descriptor). Each put and get operation can accept and/or generate key values, according to the behavior of the resource:

Passing in a null key for put/get may be used to start a new conversation. Such an operation is not considered to refer to any specific prior put/get operations, although it can implicitly refer to the internal state of the resource.

Generating a null key from put/get may indicate that no later operation should be or need be attempted for the current conversation, terminating the exchange. However, depending on the resource, it may be possible to refer to the key passed into an earlier put operation again.

Passing a non-null key in for put/get may refer to an existing conversation, and may associate the operation with a prior one that generated the key. Using the key multiple times, if allowed by the resource, may start multiple conversations branching out from a first one; however, this behavior may only be appropriate for some situations.

Generating a non-null key from put/get may indicate that a later operation may refer to the current one.

Passing a key to a resource that did not generate it may result in an error, and keys can occasionally be localized to particular arenas in the runtime environment.

Figure 3:
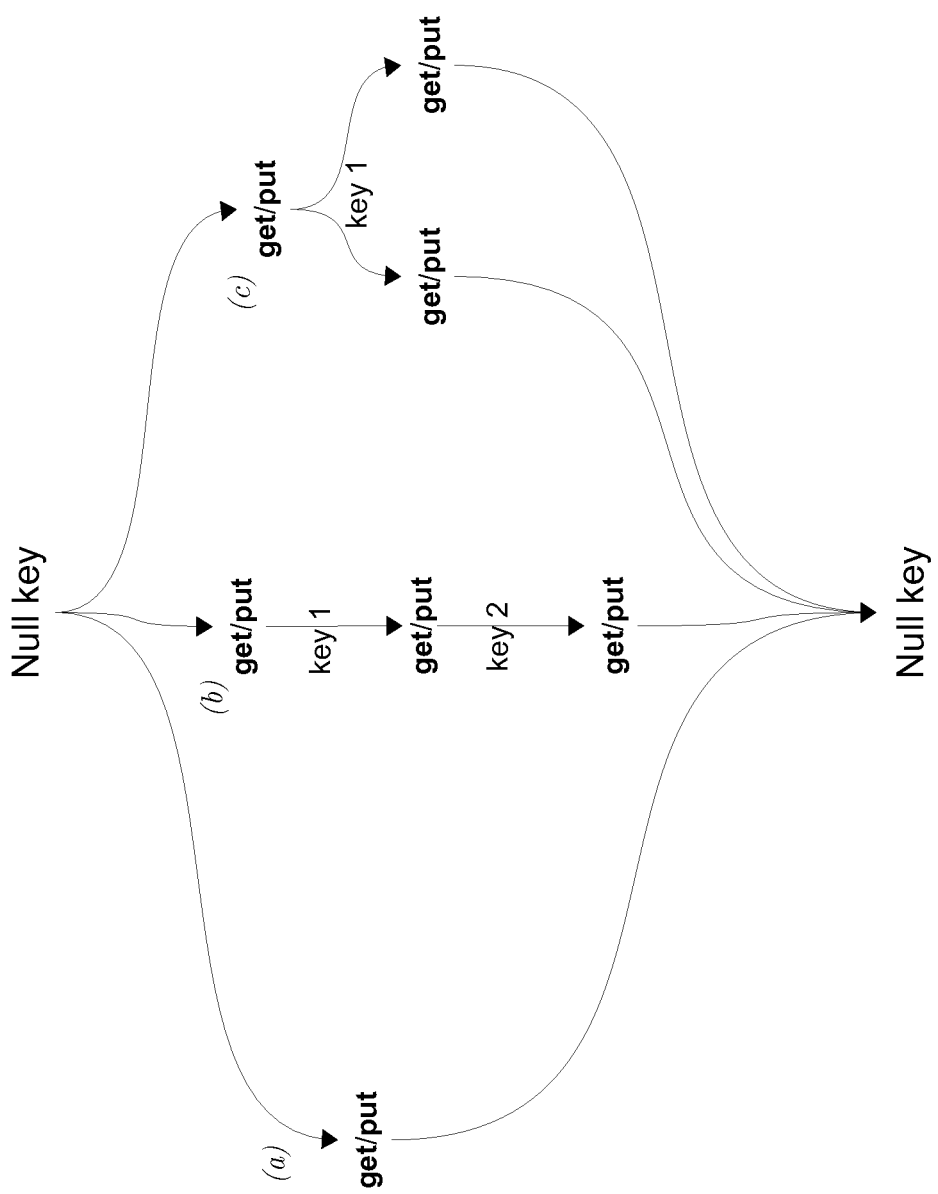
FIG. 3 illustrates the use of key-passing for communication, according to various embodiments of the invention.

FIG. 3 illustrates three kinds of conversation that may be supported by key-passing. The conversation designated by "(a)" in FIG. 3 may be a single-operation conversation. In this conversation, a null key is shown as the operation input, and a null key is generated by the operation. Conversation (b) may be thought of as a sequential conversation. In this conversation, a null key may be used as the first operation input, in response to which key 1 may be generated. Key 1 may then be used as input to a second operation, and key 2 may be generated by the second operation. Key 2 may then be input to a third operation, which may generate a null key. Finally, in conversation (c) a null key may be used as an input to a first operation, which may generate key 1. Key 1 may also (either in a sequence with the first operation or in parallel) be used as an input to further operations, which may generate null keys.

Embodiments of the invention may support high-level constructs that abstract the setup and teardown of contexts used by codelet complex contexts, and which may also assist complexes when a parallelized form of traditional LIFO request-response behavior is needed. Although use of native function calls may be perfectly acceptable for commonplace or lightweight actions, such as API calls or small calculations, larger functions in a program may be implemented in terms of resources, by utilizing "high-level procedures."

Procedures may be dealt with like any other resource—one can put parameters into a procedure and/or get associated return values out of a procedure. Because, according to embodiments of the invention, a procedure may be considered to be a resource, each procedure exists in the runtime's view as a small resource descriptor in memory with associated executable code.

Every actively executing procedure has an associated context, which stores any information used by a procedure to record its situation or state (e.g., variables and cached values), as noted earlier. When put is invoked on a procedure, a new procedure context may be created in preparation to start the procedure running, with one portion of it initialized with parameter inputs, one portion reserved for a return value, and the remainder reserved for the procedure's own use during execution. Once a context has been created, any entry codelets for the procedure may be scheduled to run, and a codelet may additionally be scheduled to notify the caller that the put has completed. When the caller requires the procedure's output value (or, in the absence of an output value, when the caller requires notification of a procedure's completion), it may issue a get to the procedure resource, using a key that may have been returned from the original put. Once a procedure has completed execution and has generated an output value, if any, the value may be passed back to the caller via the completion codelet from the aforementioned get operation. Note that event ordering is minimally sequential when interacting with procedure resources; the procedure context may be initialized at any time after the initial put operation, the put completion codelet may be executed at any time after the entry codelets have been started, the get operation may be started at any time after the put completion codelet starts, and the get completion codelet may be started at any time after the procedure completes.

Extensions to such a runtime and execution model may provide support for procedures acting as high-level co-routines. By using specifically keyed put operations, one can push successive values into an executing procedure, and using multiple get operations, one can pull values out. This may be especially useful for procedures that can be check-pointed or whose contexts can be versioned, or where particular branches of a procedure's execution can be restarted with different input values; it may also be useful to establish a request-response interaction paradigm between procedures and their callers.

In embodiments of the invention, storage resources may act as managers for particular memory arenas. When an object is put into a storage resource, space for the object may be allocated, the object may be copied in, and a key for the object may be generated. If the required amount of storage space is unavailable, the put may not be able to satisfy the request immediately, and may even fail outright or fall back to secondary storage.

Figure 7:
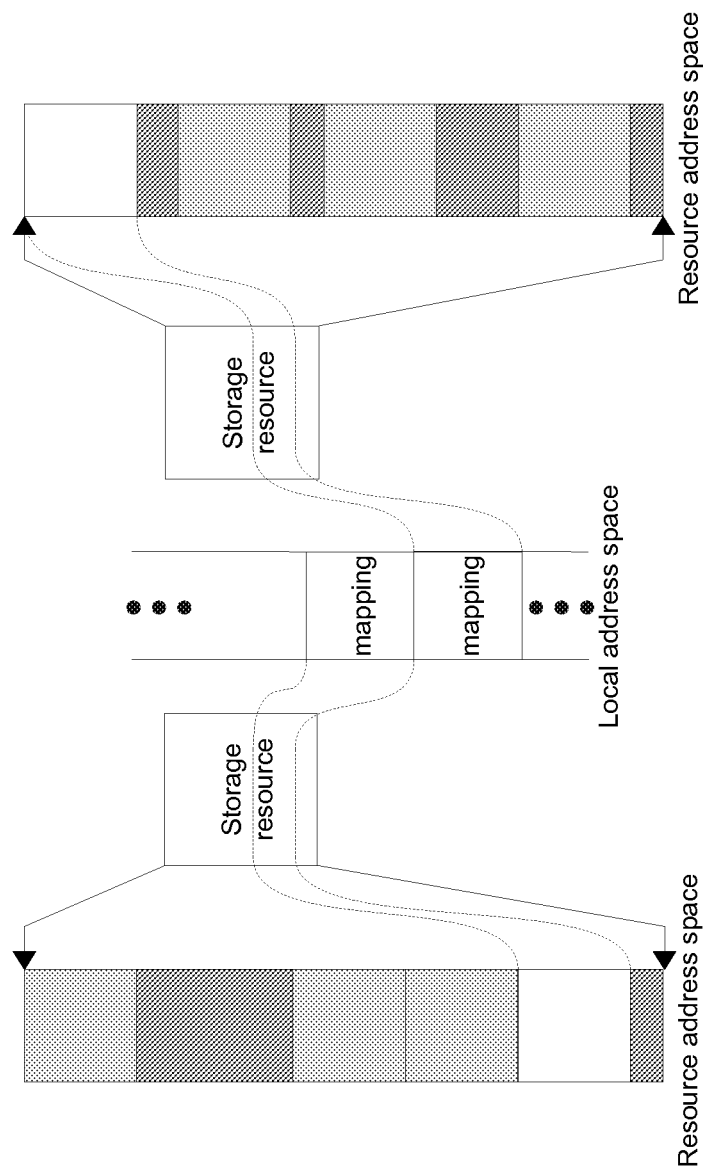
FIG. 7 shows an example of storage mapping according to various embodiments of the invention.

While data stored in a storage resource may be accessible using the conversation key that was generated from the put that placed it in the resource, it may also be "mapped" into addressable memory, allowing an application to obtain a local pointer by which the data may be accessed. FIG. 7 shows a conceptual diagram of the relationship between a storage resource, the application's local address space, and the storage-resource-private address space used to satisfy mapping requests. If it is not possible to obtain an address that maps directly into the desired resource, a local copy of the stored object may be created instead. Some embodiments of the invention may synchronize changes made to mappings (including copied objects) automatically; other embodiments may require explicit interaction with storage resources to synchronize changed. When it is no longer needed, the mapping may be destroyed to release the address range or memory associated with it. Mappings may additionally allow the user to specify how the data will be used and how the desired mapping should be made, which may include such options as access permissions and/or caching discipline for the mapping. Note that it may not be possible to make any guarantees, a priori, about whether mapped data may be shared amongst multiple application components; even if one knows that the storage resource must maintain a local copy of the mapped range, that local copy may still be shared if multiple mappings are made locally.

Although storage resources may offer a convenient abstraction for handling non-local data, user code may still need to keep track of mapping locality where necessary. For example, a mapping that is local while running on one thread may not be local while running on another. This means that a mapping's user may need either to unmap in between reschedules to different threads or to ensure that any reschedule occurs on the same thread.

Storage resources that manage address space that is directly accessible to executing codelets, and that do not require codelets to map and unmap their data in order to access it, may be referred to specifically as "allocators." As mentioned above, every locale has an associated allocator that manages any memory attached to it and its subordinates, and with which codelets' contexts, inputs, and other incidental data are stored. Threads' stacks, heaps, static data, and/or code may also be held with storage resources. Each codelet's environment buffer may be used to select an appropriate allocator for allocation requests, although some embodiments may take other factors into account or potentially disregard the environment buffer entirely in some cases.

Processing resources may constitute a further component of embodiments of the present invention. Processing resources may generally permit scheduling of get completion codelets. For example, when getting from a null key, the resource may schedule the codelet whenever it next deems fit. If more precise control is needed, the processing resource may accept a job description pushed in with a put, and the key resulting from that put may be used one or more times with get to schedule jobs with more precise parameters. In some embodiments of the invention, one processing resource may be created per hardware thread, and one or more delegating resources may be created in layers above.

The most common type of processing resource is a codelet scheduler (or simply "scheduler"), although processing resources may also provide software interfaces to graphics processing units (GPUs), field-programmable gate arrays (FPGAs), or other processor and coprocessor hardware. While the thread-level schedulers may actually run scheduled codelet instances, higher-level (e.g., process- or host-level) schedulers may be used to buffer codelet instances and forward them to the thread-level schedulers as codelet instances and schedulers become available.

A leaf locale's scheduler (or "leaf scheduler") may manage a deque (double-ended queue) of scheduled codelets. A codelet scheduled to a locale from within itself may typically be given priority and a faster scheduling/dispatch path than other codelets; this is not a requirement, but may assist in speed optimization. Non-leaf schedulers may typically manage a simpler work deque, with no faster or slower paths.

Figure 9A:
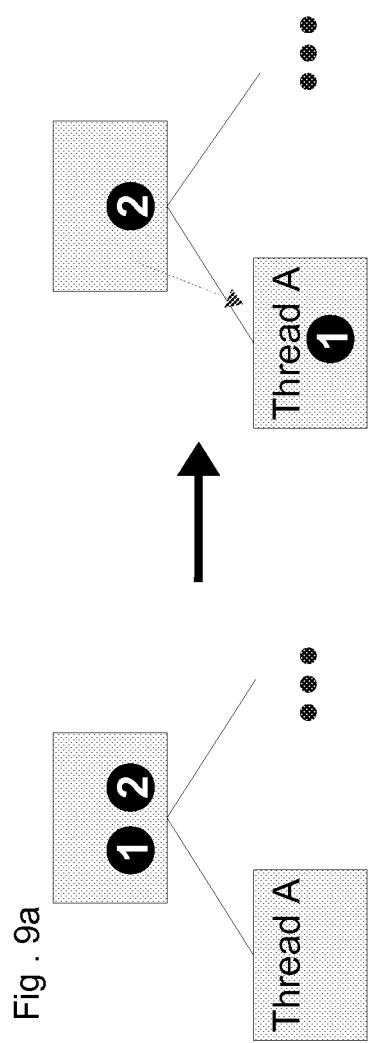
FIG. 9, consisting of FIGS. 9a and 9b, shows the operation of hierarchical work-stealing schedulers, according to various embodiments of the invention.
Figure 9B:
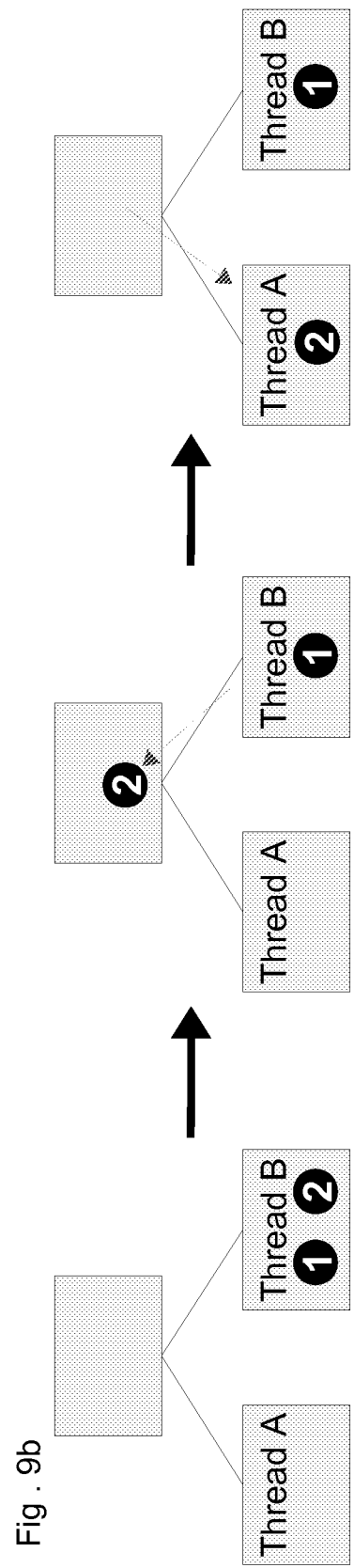

Under normal operation, each leaf scheduler may be stepped repeatedly by the runtime core, which may cause the codelet instance at the head of each one's scheduling deque to be popped off and executed. If the leaf scheduler has an empty deque, the scheduler for its parent locale is consulted, and asked to give some work to the leaf scheduler. If there is anything in the parent's scheduling deque, the head of that deque may be popped off and passed to the leaf scheduler for execution (FIG. 9a); if not, the parent may try to steal work from one of the leaf scheduler's sibling schedulers, and if successful, may remove that work from the sibling scheduler's tail (FIG. 9b). If no sibling scheduler has any work to do, the parent may consult its parent, and the process may continue in this fashion. If no work can be found for the leaf scheduler, it and its associated thread may be placed in an idle (e.g., low-power) state until more work arrives.

A codelet may be scheduled to either end of a scheduler's deque, depending on the intended behavior. Scheduling may typically be directed to the tail of the deque, so that the next thing scheduled will be the last thing executed, maintaining a roughly first-in first-out (FIFO) ordering. However, scheduling may also be directed to the head of the deque, so that the next thing scheduled will be the next thing executed, maintaining a roughly LIFO ordering. The latter form may be useful, for example, when deep recursion is used, to avoid taking up all available memory with bifurcated scheduling requests. It should be noted that schedulers in different embodiments of the invention may not be deque-based internally, and may take factors other than request ordering into account when selecting a codelet to execute. In addition, some embodiments' schedulers may treat application-based differentiation between FIFO- and LIFO-ordered scheduling as little more than a hint, or may disregard it entirely. (For example, a scheduler may be able to make predictions about a program's behavior dynamically such that dynamic scheduling decisions that largely or entirely ignore program-requested FIFO or LIFO ordering result in better performance than those that carefully honor FIFO/LIFO ordering.)

Embodiments of the present invention may further include communications and/or synchronization resources. Communications resources may be used to shuttle data between different parts of a program and may permit a higher-level abstraction over low-level stream- or message-based communication interfaces that may participate in runtime abstractions like codelets, nodelets, etc. Synchronization resources may provide access to codelet-based implementations of semaphores, barriers, etc.

One useful concept according to embodiments of the invention may be the nodelet. A nodelet is a collection of resources and/or codelets that may be accessed via a shared service, and which may be made available, e.g., over a network socket of some sort. This may facilitate, for example, management of memory and resource addresses that may need to be shared, and may allow an application to avoid having to dynamically manage address mappings between hosts and address spaces. In contrast, a nodelet may permit one to allow more widespread access to specific public resources and codelets by registering them with the nodelet. A nodelet may: (a) initialize the served resources and start any needed background codelet complexes; (b) manage registration of exported resources; (c) control access to served resources; (d) manage auxiliary state(s) associated with use of the nodelet; (e) control optimization of access patterns; and/or (f) de-initialize served resources when the nodelet is shut down. A nodelet may be created and started explicitly within the runtime environment, or it may be started automatically (e.g., by naming a dynamic library in a configuration file). A nodelet may also be started immediately along with a network service or on demand, when explicitly accessed. Once resources have been registered with a nodelet, put/get requests may be issued remotely to interact with them locally. Similarly, once codelets have been registered with a nodelet, it may be started locally by remote request. Byte-serialization may be needed, in some cases, for data transfers.

Because many resources may provide features beyond the get and put primitives, a nodelet may also provide some remote type introspection facilities so that proxy resources with appropriate types and functionality may be set up to translate local requests to remote requests. For example, a storage resource may provide mapping/un-mapping functions that cannot be provided across a network. These functions may, for example, be emulated locally by a proxy resource that may maintain a local cache of objects that have been inserted into or retrieved from it, using the forwarded get and put to manage actual storage in the remote resource.

A nodelet's implementation may multiplex external connections for internal resources and codelets. The nodelet may be thought of as providing a "wrapper" around a set of resources/codelets that may be identified, e.g., with integers, and may accept indirect put/get request messages that may direct it to interact in particular ways with those resources/codelets. Nodelets may provide for transparent access to remote resources and codelets by establishing surrogates locally that act as proxies but appear similar to their remote counterparts, and that allow local interactions with those surrogates to be forwarded to a remote nodelet. When a nodelet receives a get request message from a remote requester, it may forward the request to a local resource and, when the get operation completes, the result of the get can be returned to the requester. When a nodelet receives a put request message, it may pull the parameter out of the message and put it immediately into the applicable surrogate resource, and may again forward the put completion to the requester. When a nodelet receives a request to execute a codelet, it may extract the context and input parameters from the request message and run the requested codelet locally; when the codelet runs its chain pair, its input can be forwarded back to the requester. Embodiments may allow forwarding of identification for a further chain pair, so that a codelet on the requester's side can trigger a further chain codelet back on the nodelet's local side. This process may potentially be repeated indefinitely if codelets on either side of a nodelet continue exchanging data bidirectionally.

When starting up a nodelet, local codelets and resources may be registered with it so that remote requesters can interact with them. The nodelet may also establish associations between remote resources/codelets and local surrogates to provide for interaction with them; some embodiments may provide for automatic detection and registration of local resources/codelets for registration or for detection of and association with remote resources/codelets, and embodiments may allow or require the application to register and associate with resources/codelets.

Figure 6:
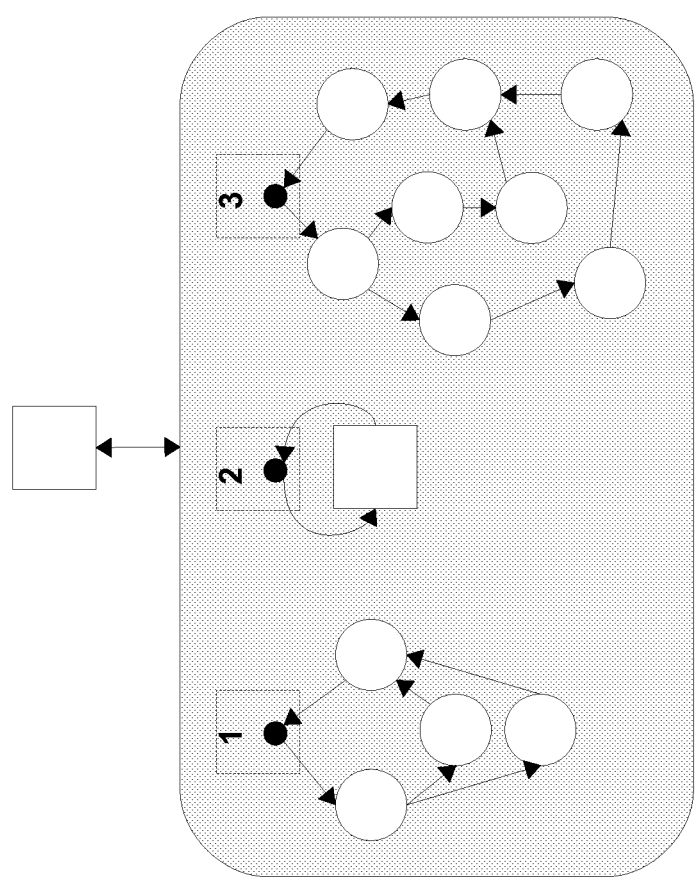
FIG. 6 shows an example of a nodelet, according to various embodiments of the invention.

FIG. 6 shows a nodelet with three resource mappings, according to various embodiments of the invention. The nodelet may provide virtualized resources for IDs 1, 2, and 3, each of which may have its put and get operations connected to other resources.

Programlets may also be used in some embodiments of the invention. A programlet may be thought of as a program whose components are presented to the runtime software in an abstract form, and which may be interpreted or dynamically compiled to native code, and which may be run in embodiments of the inventive distributed runtime environment. Programlets may permit automatic distribution of workload across connected runtimes without a-priori knowledge of the locations of the resources involved. That is, the abstract program form of a programlet may permit the runtime system to structurally manipulate the program to sequence and distribute its data and computation intelligently. A programlet may enable the following capabilities in the runtime: (a) breaking up large chunks of data and pushing them out to other locales in the runtime system; (b) breaking up long computations so that intrinsic parallelism can be recognized and exploited; (c) managing data and code locality (which may include, for example, breaking up large chunks of data and spreading them out over multiple nodes; coalescing or unifying disaggregated data; timing and scheduling long computations across nodes; duplicating, caching, and sharing data; and/or propagating changes to data); (d) tracking, limiting, and/or prioritization of resource usage and overhead; (e) garbage collection; (f) interpretation, dynamic code generation, and managing the associated state(s); and/or high-level representation of applications.

A problem that may be encountered when creating distributed or multithreaded programs is managing data, especially in terms of placement, migration, and lifetime. Embodiments of the present runtime system may use a high-level object-oriented type system to help address these concerns, as well as to provide other extensions to assist the runtime system, programmer, and user with runtime operations.

Types may be used to identify and describe the specific layout of objects in memory to which those types are ascribed. If a type is ascribed to an object, that object may be said to be an instance of that type. Embodiments of the invention may establish different varieties of type, including "basic types" that may prescribe the layout of objects in memory and potential interactions with those object and "synthetic types," which describe type requirements that a basic type must have. Basic types may further be classified as "concrete types," which may fully describe the layout of an object and all permitted interactions; "abstract types," which may partially describe the layout and permitted interactions (and which thus cannot be instantiated unless as part of a concrete type); and "interface types," which may specify only permitted interactions and may require greater interaction overhead, but require no additional storage overhead in instance objects. Embodiments may support additional variations on types (e.g., concrete concatenations, unions, and arrays of types, forms interface types with higher space but lower time overhead, etc.)

In embodiments of the invention, a more fundamental distinction may be made between "low-level" and "high-level" types. Low-level types may include primitive types such as fixed-size integers and reals, architectural pointers, and combinations of these in array, record, and union types. In contrast, high-level types describe objects with some well-defined, scrutable, and finite format in memory. High-level types may be directly related to some number of other high-level types by a supertype relationship, which may extend the traditional notion of the object-oriented super-/subclass relationship. If type T is a supertype of type S (or, equivalently, S is a subtype of T), then all storage and interactions associated with type T are also associated with S; in practice this may mean that every instance of type S contains an instance of type T that may be used when referring to storage inherited by S from T. Closely related to the supertype/subtype relationship is the assignability relationship. If type T is assignable to type S, then a pointer value referring to an object of type T may be assigned to a variable that points to type S, or stated differently, S is a supertype of, or the same type as, T. The statement "S is a subtype of T" may be symbolically represented hereinafter as "S ⊂ T", and the statement "S is assignable to T" as "S⊆T". Negated forms, "S ⊄ T" and "S ⊈ T" may also be used to indicate that S is not a subtype of or assignable to T, respectively. Note that the subtype relationship is transitive; thus for types R, S, and T, if R ⊂ S and S ⊂ T, then R ⊂ T.

Every high-level object in the runtime system may have an associated high-level type, and every type in embodiments of the inventive runtime system may have an associated type descriptor object in memory that can be used to inspect the type of arbitrary objects at run time. Introspection provides a programmer with the ability to name and export elements of types for later examination. In addition, first-class type objects may be created dynamically, which may allow the compile-time language environment to be extended arbitrarily at run time, and which may simplify migration of program components. (For example, if host A needs to offload work using type T to host B, host B may obtain its own copy of type T dynamically and perform that work, without needing to be recompiled or restarted. B may potentially even create a proxy type that may forward back to A when necessary, but which may otherwise appear identical to host A's version of T.)

Another layer of introspection may be added on top of the basic type-as-object layer: Each type object may include descriptions of type members, so that an object's state may be accessed at run time by using language-native names. This may enable a many-threaded or distributed application to be debugged at a higher level than traditional binary-image-based debuggers can handle and may help simplify distribution of an object's functionality between address spaces and applications.

Embodiments of the type system may support polymorphism, virtual inheritance, and/or interface types, which may enable full interoperability with existing systems using programming languages such as C++, C#, and Java. Embodiments of the inventive runtime system may also support type synthesis, whereby multiple types may be combined in an expression using type union, intersection, negation, and/or subtraction operators. Embodiments of the invention may not necessarily be required to include a capability of allowing instances of synthetic types to be created, since they may include unlimited numbers of component types, but they may be matched against other types and may provide a compact representation that may, for example, enable two sides of a remote connection to type-check parameters and return values bound for the other side of the connection without communicating.

Figure 8C:
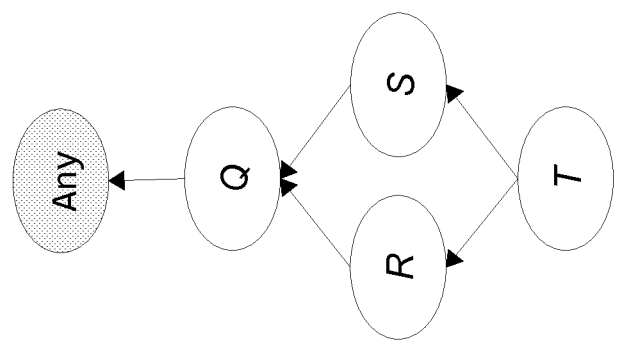
FIG. 8, consisting of FIGS. 8a-8c, shows an example type hierarchy according to various embodiments of the invention.
Figure 8B:
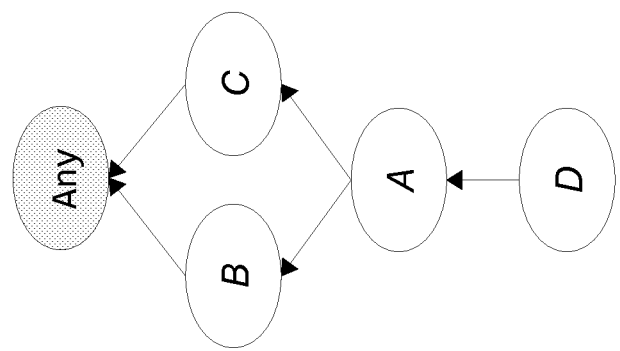
Figure 8A:
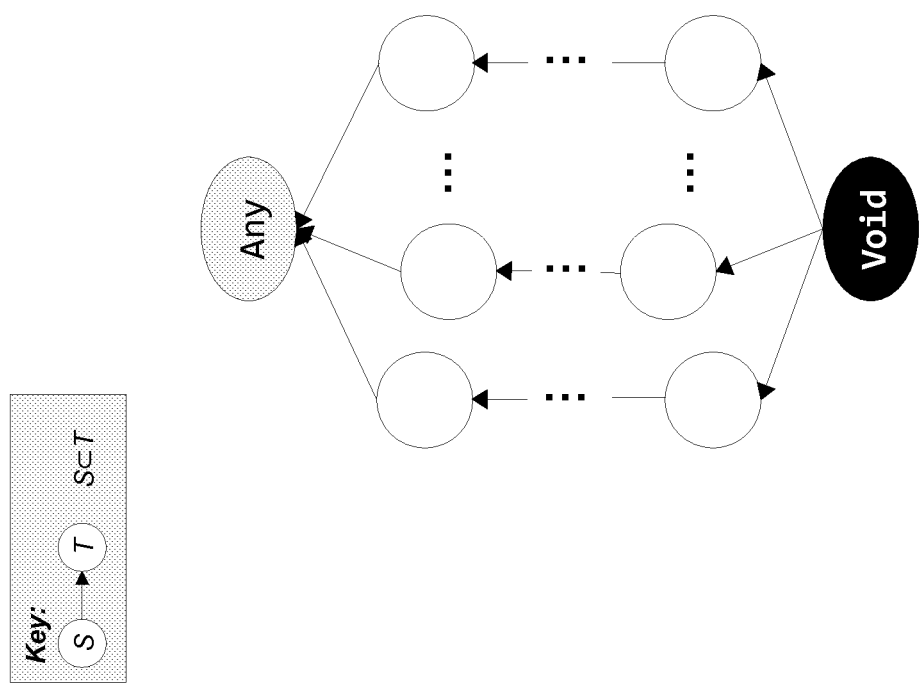

Two special high-level types may be present in a runtime system according to various embodiments, Any and Void. Any may be established as an interface type by the runtime, and may act as the supertype of all other high-level types so that it may be used as an all-inclusive type wildcard and participate in synthetic type expressions as a universal set. Void may act as the subtype of all other types and may be used as an all-exclusive wildcard and participate in synthetic type expressions as a null (empty) set. The only valid pointer to type Void may be NULL, since an instance of Void would necessarily contain an instance of every other possible type. (Note that this establishes a NULL pointer value as assignable to a pointer to any type. Note also that particular embodiments of the runtime software may support NULL pointers relative to a particular hardware/software locale; for example, a hardware processor core running in a small local memory may use address 0 for its NULL, but from outside that core that same address may be mapped as [e.g.] some multiple of 65,536. This may allow NULL to be used to refer alternately to no object at all, or to the entirety of memory associated with a codelet's containing locale.) The relationship between Any, Void, and other types within the type system is shown in FIG. 8a.

In some embodiments, the type system may permit, ease, or enhance the implementation of data partitioning, copying, serialization, and/or deserialization routines. Although primitive data types such as fixed-width integers or real numbers may easily be copied and migrated (byte order notwithstanding), higher-level types may have any amount of context associated with them, any of which may need to be transported, reconstructed, or discarded when an object is moved between disparate address spaces. The interface types Copyable and Transferable may be used for these purposes, of which Copyable may be useful for duplicating an object within the same address space and Transferable may be useful for reducing an object to a byte stream (serializing) or reconstituting an object from a generated stream (deserializing).

Additionally, it may be desirable to partition some objects, such as large arrays, sets, or maps, into pieces that may be used independently of each other. Such structures, if they implement Partionable and are given a function mapping between indices and partitions, may be broken up so that their components can be assigned to different resources or pushed out to different hosts. Partitionable objects may also be left un-partitioned by giving them a constant index-partition mapping so that all indices may be mapped to the same partition.

The type system according to various embodiments may permit the use of set-theoretic union, intersection, subtraction, and/or negation operations (e.g., to specify input and output constraints for resources) in the form of synthetic types, although it may not be possible to instantiate such types directly per se because their implementations may not be fully described. Synthetic types may be described with data structures in memory, which may be used to determine relationships between types at run time. Synthetic types may be created statically or dynamically, and may be reduced and cached when possible, which may allow direct pointer comparison for basic type equality checks and may help avoid buildup of unused data structures.

To elaborate further on the determination of types based on set-theoretic expressions, as discussed above, union (∪), intersection (∩), subtraction (−), and negation (−) may be used to combine or filter the set of objects accepted by a type. For example, for a type T and synthetic types U and V, as in set theory, T⊆(U ∩V) if and only if (iff) T⊆U and T⊆V. Similarly, T⊆(U∪V) iff T⊆U or T⊆V or both. One type may also be subtracted from another; T⊆(U−V) iff T⊆U but T ⊈ V. Finally, type negation, equivalent to subtraction from Any, results in types such that T⊆−U iff T ⊈ U. Again, as for set theory, T∪Any=Any, T∪Void=T, T∩Any=T, T∩Void=Void, T−Any=Void, T−Void=T, −Any=Void, and −Void=Any. Boolean-algebraic transformations, including applications of De Morgan's laws (−(S∪T)=(−S)∩(−T) and −(S∩·T)=(−S)∪(−T)) may be performed on synthetic types using these rules, for example to reduce the types to a particular form for internal representation.

A user-constructed type may include multiple identical supertypes. (E.g., given types Q, R, S, and T as shown in FIG. 8c, any instance of T must include two instances of type Q, one each in its instances of R and S.) Different embodiments of the invention may perform casts within such types in different ways; for example, a runtime may implement all casts from type T to Q by selecting R's instance of Q, but casts from R or S to Q by selecting the instance contained in R or S's respective instance. Regardless of implementation specifics, a program that knows about the actual structure of the type's data may still access all supertype instances directly, however.

The above-described type system may, in some embodiments, be implemented using extensions to the "v-table" approach found in the C++ programming language. In this approach, the memory image of any high-level object begins with a pointer to a table that describes the type of the object, including any supertypes the object has. In addition, a v-table may include pointers to virtual method and codelet implementations, as well as other type-related data (e.g., variables shared amongst all instances of a type whose values are peculiar to that type but not its subtypes). Each high-level type may have one such type data table associated with it, and all instances of that type may reference it in their memory image. Furthermore, type tables such as this may be used in some embodiments of the invention to represent synthetic type expressions as well as concrete type information.

When converting between pointer types within the type hierarchy, various forms of casting may be used to ensure that the correct pointers are used. The simplest cast to effect is an "upcast," which casts from a pointer to a subtype to a pointer to a supertype. Using types from FIG. 8c as examples, casting a pointer to type R to a pointer to type Q may be done by offsetting the R instance's address by the width of an architectural pointer or, within a programming language, by taking the address of an appropriate supertype instance (e.g., &ptr→super in C). The same may be done to cast up any number of levels in the type hierarchy—a cast from T to Q may be effected by casting from T to R, then R to Q, or alternately from T to S, then S to Q. Casting from a supertype to a subtype (e.g., from Q to R, or from R or S to T), or "downcasting," may be done by reversing an upcast (generally, subtracting offsets instead of adding them). Casting to a subtype of a supertype or supertype of a subtype ("cross-casting"; e.g., R to S, which be performed within an instance of T) may be done by combining the two methods in sequence (e.g., R to Q to S). Such casts may either be applied statically by a compiler able to predict their outcomes, or dynamically by software embodying the invention. Dynamic casts may utilize the data stored in each type's type data table to determine the correct offsets to apply to pointers. Embodiments of the runtime may generate an error (e.g., via a function return value, a native exception-handling mechanism, or a codelet's cancel fork) if an attempt is made to cast an object of type S to type T when S ⊈ T.

A high-level object in embodiments of the inventive runtime system may have arbitrary data attached to it, which may be added, removed, or modified dynamically, and which may migrate along with the object. Context-sensitive and -insensitive data may be attached to objects dynamically by creating tags, which may act as sideband comments on the objects. Tags may be used to provide hints to the runtime, such as where a particular object should be placed, how long a codelet may be expected to run, or what modifications to the environment may be preferable or beneficial for the codelet. They may also be used to effect third party communication channels between application components that use an object, such as recording the object's placement or usage history.

The various aspects of embodiments of the inventive runtime system may be implemented along with a monitoring and control capability, in order, among other things, to track program state across many threads and/or nodes. Components of the runtime system may be furnished with a high-level status interface so that information can be extracted, logged, aggregated, and displayed, possibly in near-real-time. Schedulers may also be furnished with an integrated control interface that may allow, for example, suspension and examination of a single thread, thread groups, or the entire runtime system across multiple nodes. A monitoring front-end may also be provided for interacting with the runtime system.

A component in embodiments of the runtime system may be made visible to a monitor by registration of a public interface definition at with the runtime. This may serve to let the runtime system know the status outputs provided by the component, as well as the formats of data in those outputs and how the data can be aggregated or collected, if at all. The status interface may be dependent on the type system described above for determining how the monitor system may interact with it. For example, such parameters as update frequency, style of aggregation, style of collection, formatting, labeling, and/or location information may be provided through the type interface. A suitable set of built-in types, such as counters, timers, and/or enumerated bit sets may be provided to enable quick and easy addition of status interfaces, although user-built status types may be added, as well.

Objects in embodiments of the inventive runtime system may be able to register control objects that may allow a monitor to dynamically control their execution. For example, schedulers may register control objects that may allow scheduling to be stopped or started in between jobs, as well as allowing specific jobs to be exempt from scheduling. Test interfaces may also be implemented that may allow components to perform specific tasks whose results may be examined.

Control input may be facilitated using a local monitor interface, which may cause execution of application-specified code (e.g., via callback functions) in a special monitor thread. This may involve synchronization between callbacks and objects that they affect, although most control callbacks may simply set flags or overwrite information that may eventually be seen by controlled objects.

A monitoring front-end may connect to the runtime system back-end via a socket served from within the runtime system. The back-end may allow direct access to registered types, individual and aggregate status information, and/or control information, as well as potentially allowing basic runtime tasks, such as connecting to remote nodes, creating/destroying/interacting with resources, and/or killing readied jobs. In some embodiments, the back-end may provide "hooks" that may allow a debugger to be started on the runtime system, which may thus eliminate or reduce the need for the front-end to do this, and which may potentially distribute the initialization to multiple remote nodes to which front-end access may be limited.

Various embodiments of the invention may permit foreign functions that have linker-/loader-level binary compatibility with a given implementation of the system to be wrapped with appropriate interfaces and used as code components on system resources. The runtime system itself may be embodied as a static or dynamic library that may be linked with code for use as an API, or it may be embodied as an executable file linked to a library. This latter form may permit the runtime system to be applied by the operating system to application components, and which may permit the runtime system to be started as a passive service for use with nodelets and/or programlets.

Various embodiments of the invention may incorporate a memory allocation discipline as follows. Values passed by reference into runtime interface functions may be managed by the caller, not by the runtime interface. They may remain in existence at least until the called interface function returns, and if the runtime system must retain such values, they may be copied out by the runtime system and retained/managed internally. Non-Copyable objects may need to be referenced indirectly, if possible without impacting performance, rather than being copied out. Input values passed by reference into codelets from the runtime interface may be treated similarly to values passed into the interface. If memory for such values must be managed explicitly, a chain pair may be passed into the codelet along with its input; when the chain codelet is run, responsibility for the referenced value may be considered to have passed back to the entity that originally passed in the input (as for a return from a function call). If the value is needed after that point, the codelet receiving the input must copy the input out (e.g., into its context). Values returned by reference from the runtime system may fall into one of three categories: (1) static or thread-local data whose memory does not need to be released when no longer in active use; (2) data associated with a containing object, as long as the containing object falls into one of these categories and that data's storage remains allocated for the remaining lifetime of the container; or (3) explicitly managed memory and state (e.g., via create and destroy interface functions).

It will be appreciated by persons skilled in the art that the present invention is not limited by what has been particularly shown and described hereinabove. Rather the scope of the present invention includes both combinations and subcombinations of various features described hereinabove as well as modifications and variations which would occur to persons skilled in the art upon reading the foregoing description and which are not in the prior art.

We claim:

1. A distributed computing system, comprising:
   one or more resources configured to facilitate the execution of one or more operations using hardware, software, or both;
   two or more processing devices configured to be operated by at least a subset of the resources;
   wherein the one or more resources are configured to execute operations under the control of one or more codelets, wherein a respective codelet is a dataflow element that holds input dependencies on other codelets or resources, and which is configured to run a piece of code when all input dependencies are met and to run to completion without being preempted or blocked; and
   wherein a codelet is further configured, upon encountering a condition that would normally result in blocking, to spill any non-volatile data to a context of the codelet, register a chain context and codelet with a software interface, and end its own execution, enabling resumption of execution using the chain codelet and information stored in the context.

2. The system according to claim 1, wherein at least one of the resources comprises a scheduler configured to schedule execution of one or more codelets on at least one processing device.

3. The system according to claim 2, wherein at least one scheduler is associated with one or more resources associated with a particular locale.

4. The system according to claim 3, wherein at least one scheduler is not associated with a locale in a hierarchy of locales.

5. The system according to claim 3, wherein locales within the system are organized in a hierarchy, and wherein a scheduler associated with a locale at a given level of the hierarchy is configured to request work from a parent scheduler at a higher level of the hierarchy.

6. The system according to claim 3, wherein locales within the system are organized in a hierarchy, and wherein a scheduler associated with a locale at a given level of the hierarchy is configured to request work from other schedulers at different positions in the hierarchy.

7. The system according to claim 3, wherein locales within the system are organized in a hierarchy, and wherein a scheduler associated with a locale at a given level of the hierarchy is configured to interact with one or more sibling schedulers at the same given level of the hierarchy to request work, provide work, or both.

8. The system according to claim 1, wherein at least one of the one or more codelets references a further codelet.

9. The system according to claim 1, wherein at least one of the one or more codelets is capable of being run on disparate types of processing devices.

10. The system according to claim 9, wherein at least one of the one or more codelets includes multiple forms of a run fork or multiple forms of a cancel fork or both multiple forms of a run fork and multiple forms of a cancel fork, in order to enable the at least one of the one or more codelets to run on the disparate types of processing devices.

11. The system according to claim 1, further comprising a hierarchical type system configured to categorize objects in the system.

12. The system according to claim 11, wherein the hierarchical type system comprises a multiplicity of types organized according to a hierarchical structure and enabled to support multiple inheritance, multiple interfaces, and synthetic types.

13. The system according to claim 1, wherein one or more nodelets are provided, wherein at least one of the nodelets is configured to provide access to multiple resources, wherein a nodelet is a collection of resources, codelets, or both resources and codelets, that are accessible via a shared service.

14. The system according to claim 1, wherein the system is configured to support the use of one or more programlets.

15. The system according to claim 1, wherein the system is further configured to provide a respective codelet with an environment buffer upon starting of the codelet, wherein the environment buffer configured to contain references to one or more of the locales selected from the group consisting of: a locale in which the codelet is currently executing; an origin locale; a sender locale; a receiver locale; and a destination locale.

16. The system according to claim 15, wherein the environment buffer is configured to permit the respective codelet to modify the environment buffer to redirect an execution path of the codelet.

17. A non-transitory computer-readable medium containing instructions that, upon execution by one or more processing devices, cause the implementation of operations in a distributed computing system, the operations comprising:
  operating one or more resources configured to facilitate the execution of one or more operations using hardware, software, or both, wherein the hardware includes two or more processing devices, and wherein the hardware, software, or both are part of the dataflow computing system; and
  configuring the one or more resources to execute operations under the control of one or more codelets, wherein a respective codelet is a dataflow element that holds input dependencies on other codelets or resources, and which is configured to run a piece of code when all input dependencies are met and to run to completion without being preempted or blocked; and
  wherein a codelet is further configured, upon encountering a condition that would normally result in blocking, to spill any non-volatile data to a context of the codelet, register a chain context and codelet with a software interface, and end its own execution, enabling resumption of execution using the chain codelet and information stored in the context.

18. The computer-readable medium according to claim 17, wherein the operations further comprise configuring at least one of the resources to operate as a scheduler to schedule execution of one or more codelets on at least one processing device.

19. The computer-readable medium according to claim 18, wherein at least one scheduler is associated with one or more resources associated with a particular locale.

20. The computer-readable medium according to claim 19, wherein at least one scheduler is not associated with a locale in a hierarchy of locales.

21. The computer-readable medium according to claim 19, wherein locales within the distributed computing system are organized in a hierarchy, and wherein a scheduler associated with a locale at a given level of the hierarchy is configured to request work from a parent scheduler at a higher level of the hierarchy.

22. The computer-readable medium according to claim 19, wherein locales within the distributed computing system are organized in a hierarchy, and wherein a scheduler associated with a locale at a given level of the hierarchy is configured to request work from other schedulers at different positions in the hierarchy.

23. The computer-readable medium according to claim 19, wherein locales within the distributed computing system are organized in a hierarchy, and wherein a scheduler associated with a locale at a given level of the hierarchy is configured to interact with one or more sibling schedulers at the same given level of the hierarchy to request work, provide work, or both.

24. The computer-readable medium according to claim 17, wherein the operations further enabling the one or more codelets to suspend their own execution by yielding.

25. The computer-readable medium according to claim 17, wherein at least one of the one or more codelets references a further codelet.

26. The computer-readable medium according to claim 17, wherein the operations further comprise supporting a hierarchical type system configured to categorize objects in the system.

27. The computer-readable medium according to claim 26, wherein the hierarchical type system comprises a multiplicity of types organized according to a hierarchical structure and enabled to support multiple inheritance, multiple interfaces, and synthetic types.

28. The computer-readable medium according to claim 17, wherein the operations further comprise supporting the use of one or more nodelets configured to provide access to multiple resources, wherein a nodelet is a collection of resources, codelets, or both resources and codelets, that are accessible via a shared service.

29. The computer-readable medium according to claim 17, wherein the operations further comprise supporting the use of one or more programlets.

30. The computer-readable medium according to claim 17, wherein the operations further comprise providing a respective codelet with an environment buffer upon starting of the codelet, wherein the environment buffer configured to contain references to one or more of the locales selected from the group consisting of: a locale in which the codelet is currently executing; an origin locale; a sender locale; a receiver locale; and a destination locale.

31. The computer-readable medium according to claim 30, wherein the environment buffer is configured to permit the respective codelet to modify the environment buffer to redirect an execution path of the codelet.

32. A method of distributed computing, comprising:
  operating one or more resources configured to facilitate the execution of one or more operations using hardware, software, or both, wherein the hardware includes two or more processing devices, and wherein the hardware, software, or both are part of a distributed computing system; and
  configuring the one or more resources to execute operations under the control of one or more codelets, wherein a respective codelet is a computing element that holds input dependencies on other codelets or resources, and which is configured to run a piece of code when all input dependencies are met and to run to completion without being preempted or blocked; and
  wherein a codelet is further configured, upon encountering a condition that would normally result in blocking, to spill any non-volatile data to a context of the codelet, register a chain context and codelet with a software interface, and end its own execution, enabling resumption of execution using the chain codelet and information stored in the context.

33. The method according to claim 32, wherein at least one of the resources comprises a scheduler, and wherein the method further comprises scheduling, by the scheduler, execution of one or more codelets on at least one processing device.

34. The method according to claim 33, wherein at least one scheduler is associated with one or more resources associated with a particular locale.

35. The method according to claim 34, wherein at least one scheduler is not associated with a locale in a hierarchy of locales.

36. The method according to claim 34, wherein locales within the system are organized in a hierarchy, and wherein the method further comprises requesting, by a scheduler associated with a locale at a given level of the hierarchy, work from a parent scheduler at a higher level of the hierarchy.

37. The method according to claim 34, wherein locales within the system are organized in a hierarchy, and wherein the method further comprises requesting, by a scheduler associated with a locale at a given level of the hierarchy, work from other schedulers at different positions in the hierarchy.

38. The method according to claim 34, wherein locales within the system are organized in a hierarchy, and wherein the method further comprises interacting, by a scheduler associated with a locale at a given level of the hierarchy, with one or more sibling schedulers at the same given level of the hierarchy to request work, provide work, or both.

39. The method according to claim 32, wherein at least one of the one or more codelets references a further codelet.

40. The method according to claim 32, wherein at least one of the one or more codelets is enabled to run on disparate types of processing devices.

41. The method according to claim 40, wherein at least one of the one or more codelets includes multiple forms of a run fork or multiple forms of a cancel fork or both multiple forms of a run fork and multiple forms of a cancel fork, in order to enable the at least one of the one or more codelets to run on the disparate types of processing devices.

42. The method according to claim 32, further comprising implementing a hierarchical type system configured to categorize objects in the system.

43. The method according to claim 42, wherein the hierarchical type system comprises a multiplicity of types organized according to a hierarchical structure and enabled to support multiple inheritance, multiple interfaces, and synthetic types.

44. The method according to claim 32, further comprising providing one or more nodelets, wherein at least one of the nodelets is configured to provide access to multiple resources, wherein a nodelet is a collection of resources, codelets, or resources and codelets, that are accessible via a shared service.

45. The method according to claim 32, further comprising supporting the use of one or more programlets.

46. The method according to claim 32, further comprising providing a respective codelet with an environment buffer upon starting of the codelet, wherein the environment buffer configured to contain references to one or more of the locales selected from the group consisting of: a locale in which the codelet is currently executing; an origin locale; a sender locale; a receiver locale; and a destination locale.

47. The method according to claim 46, wherein the environment buffer is configured to permit the respective codelet to modify the environment buffer to redirect an execution path of the codelet.

48. A method of distributed computing, comprising:
operating one or more resources configured to facilitate the execution of one or more operations using hardware, software, or both, wherein the hardware includes two or more processing devices, and wherein the hardware, software, or both are part of a distributed computing system;
configuring the one or more resources to execute operations under the control of one or more codelets, wherein a respective codelet is a dataflow element that holds input dependencies on other codelets or resources, and which is configured to run a piece of code when all input dependencies are met and to run to completion without being preempted or blocked; and
configuring the one or more resources to execute operations under the control of one or more datalets, wherein a respective datalet is a dataflow element that holds input dependencies on other datalets or resources or resources, and which runs a piece of code when any of the input dependencies is met,
wherein a datalet includes separate internal run and cancel forks, collectively "control forks," and includes application-specified forks, and
wherein an input assigned to a datalet is associated with an identifier of the input, a value for the input, and a chain pair to be executed when the input is no longer needed, which are passed together to the control run fork of the datalet.

49. The method according to claim 48, wherein the datalets include at least one datalet selected from among the group of datalets consisting of:
an AND-based datalet, in which an application-specified fork of the AND-based datalet is run after all specified inputs have been received and prepared for use;
an OR-based datalet, in which an application-specified fork of the OR-based datalet is run after any or all of the inputs have been received and prepared for use; and
an XOR-based datalet, in which an application-specified fork of the XOR-based datalet is run after exactly one, but not all, of the specified inputs has been received and prepared for use.

50. A non-transitory computer-readable medium containing instructions that, upon execution by one or more processing devices, cause the implementation of operations in a distributed computing system, the operations comprising:
operating one or more resources configured to facilitate the execution of one or more operations using hardware, software, or both, wherein the hardware includes two or more processing devices, and wherein the hardware, software, or both are part of the dataflow computing system; and
configuring the one or more resources to execute operations under the control of one or more codelets, wherein a respective codelet is a dataflow element that holds input dependencies on other codelets or resources, and which is configured to run a piece of code when all input dependencies are met and to run to completion without being preempted or blocked; and
configuring the one or more resources to execute operations under the control of one or more datalets, wherein a respective datalet is a dataflow element that holds input dependencies on other datalets or resources or resources, and which runs a piece of code when any of the input dependencies is met,
wherein a datalet includes separate internal run and cancel forks, collectively "control forks," and includes application-specified forks, and
wherein an input assigned to a datalet is associated with an identifier of the input, a value for the input, and a chain pair to be executed when the input is no longer needed, which are passed together to the control run fork of the datalet.

51. The computer-readable medium according to claim 50, wherein the datalets include at least one datalet selected from among the group of datalets consisting of:
an AND-based datalet, in which an application-specified fork of the AND-based datalet is run after all specified inputs have been received and prepared for use;

an OR-based datalet, in which an application-specified fork of the OR-based datalet is run after any or all of the inputs have been received and prepared for use; and an XOR-based datalet, in which an application-specified fork of the XOR-based datalet is run after exactly one, but not all, of the specified inputs has been received and prepared for use.

52. A distributed computing system architecture, comprising:

one or more resources configured to facilitate the execution of one or more operations using hardware, software, or both;

two or more processing devices configured to be operated by at least a subset of the resources;

wherein the one or more resources are configured to execute operations under the control of one or more codelets, wherein a respective codelet is a dataflow element that holds input dependencies on other codelets or resources, and which is configured to run a piece of code when all input dependencies are met and to run to completion without being preempted or blocked, wherein the one or more resources are configured to execute operations under the control of one or more datalets, wherein a respective datalet is a dataflow element that holds input dependencies on other datalets or resources or resources, and which runs a piece of code when any of the input dependencies is met, wherein a datalet includes separate internal run and cancel forks, collectively "control forks," and includes application-specified forks, and wherein an input assigned to a datalet is associated with an identifier of the input, a value for the input, and a chain pair to be executed when the input is no longer needed, which are passed together to the control run fork of the datalet.

53. The system according to claim 52, wherein the datalets include at least one datalet selected from among the group of datalets consisting of:

an AND-based datalet, in which an application-specified fork of the AND-based datalet is run after all specified inputs have been received and prepared for use;

an OR-based datalet, in which an application-specified fork of the OR-based datalet is run after any or all of the inputs have been received and prepared for use; and an XOR-based datalet, in which an application-specified fork of the XOR-based datalet is run after exactly one, but not all, of the specified inputs has been received and prepared for use.

* * * * *